UNITED STATES PATENT OFFICE 1,998,975

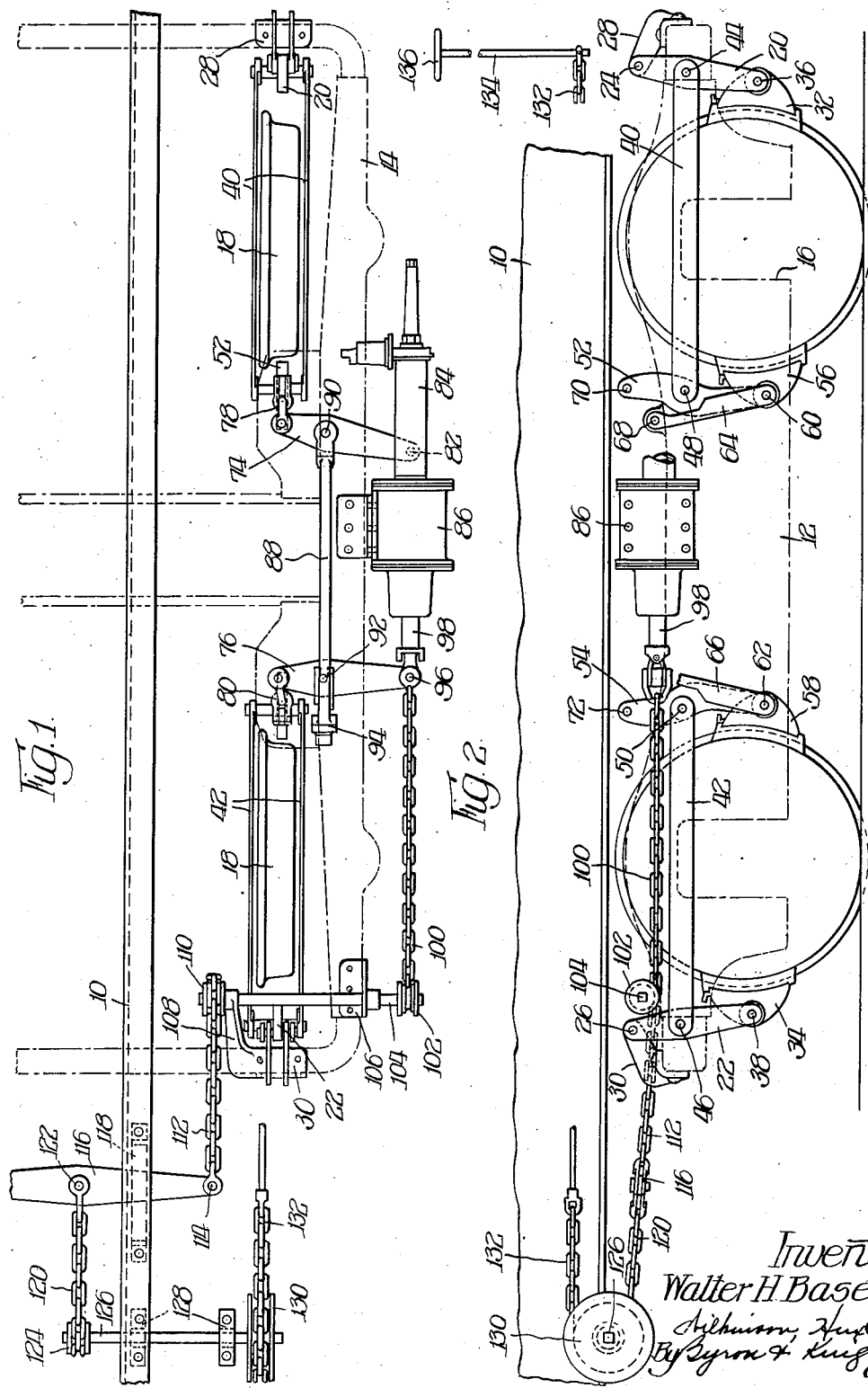

BRAKE ARRANGEMENT

Walter H. Baselt, Chicago, Ill., assignor to American Steel Foundries, Chicago, Ill., a corporation of New Jersey Application January 16, 1933, Serial No. 651,863

20 Claims. (Cl. 188—107)

This invention pertains to hand brake mechanism, and particularly to the hand brake arrangement for use with unit cylinder clasp brakes.

It is an object of this invention to provide a hand brake operating mechanism adapted for use with a cylinder operated brake mechanism wherein uniform application of the brake shoes is obtained regardless of the possible difference in piston travel of the brake arrangements on opposite sides of the truck.

Another object is to provide a hand brake mechanism adapted for use with unit cylinder operated clasp brakes which equalize regardless of the relative positions between the truck and car body.

With these and various other objects in view, the invention may consist of certain novel features of construction and operation as will be more fully described and particularly pointed out in the specification, drawing and claims appended hereto.

In the drawing, which illustrates an embodiment of the device and wherein like reference characters are used to designate like parts—

Figure 1 is a fragmentary top plan view of a car and associated truck showing the application thereto of a brake system embodying the invention;

Figure 2 is a fragmentary side elevation of the car and brake construction illustrated in Figure 1.

Although only a portion of the car body and one truck is illustrated in the drawing, it is of course to be understood that the same arrangement is applied at the opposite end of the car body, and the hand brake mechanism operates to set the brakes on opposite sides of a truck.

The car body 10 is supported at each end by means of a truck 12, each truck 12 including the truck frame 14 having suitable pedestals 16 associated with journal means such as journal boxes (not shown) having cooperative relation with the wheel and axle assemblies 18. While a unit cylinder clasp brake arrangement is illustrated, it will of course be appreciated that the hand operated brake means is adapted to be used on other forms of power operated brakes. In the construction illustrated, the dead truck levers 20 and 22 are pivoted as at 24 and 26 to suitable brackets 28 and 30 provided adjacent the ends of the truck frame disposing the dead levers outwardly of the wheels. The lower ends of said truck levers are provided with brake heads 32 and 34 pivoted thereto as at 36 and 38. The pull rods 40 and 42 are pivoted as at 44 and 46 to the dead truck levers intermediate the ends thereof, extend above the axles, and are pivoted as at 48 and 50 to the live truck levers 52 and 54 disposed inwardly of the wheels. The brake heads 56 and 58 are pivoted as at 60 and 62 to the lower ends of the live truck levers, and suitable brake hangers 64 and 66 are pivoted to said heads as at 60 and 62 and are also pivotally supported on the truck frame as at 68. The upper ends of the live truck levers 52 and 54 are pivoted as at 70 and 72 to the inner ends of the levers 74 and 76 through the clevises 78 and 80.

The outer end of the lever 74 is pivoted as at 82 to the slack adjuster 84 associated with the unit cylinder brake cylinder 86, the slack adjuster being shown particularly in application Serial No. 592,700 Mitchell, filed February 10, 1932. The levers 74 and 76 are connected intermediate the ends thereof by means of the pull rod 88 pivoted to said levers as at 90 and 92, the pull rod being provided with slack adjuster 94. The outer end of the lever 76 is pivoted as at 96 to the piston 98 of the cylinder 86. It will be appreciated that similar unit cylinder brake arrangement is provided for the wheels on the opposite side of the truck, the cylinders being adapted to be operated simultaneously from suitable control means provided on the car.

In applying the brakes, outward movement of the piston 98 causes movement of the lever 76 toward the left as viewed in Figure 1, also causing a pivotal movement of the lever about the pivot 92 whereby the lever 76 moves in a clockwise direction as viewed in Figure 1 to set the brake shoe secured to brake head 58 through the live lever 54. Setting the brake shoe causes a movement toward the right of the pull rod 42, thereby setting the brake shoe secured to brake head 34. Upon movement of the lever 76 the pull rod 88 is moved toward the left as viewed in Figure 1, causing a counter-clockwise movement of the lever 74 about the point 82, thereby moving the upper end of the live lever 52 toward the left as viewed in Figure 2 to thereby set the brake shoe secured to brake head 56, at the same time causing the pull rod 40 to set the brake shoe secured to brake head 32. Release of air in the brake cylinder causes a reverse movement of the linkage to release the brakes.

In providing hand brake mechanism where brake cylinders are utilized it is desirable that the hand brake mechanism occupy a minimum of space and yet provide an equalized system which is operable to set the brake shoes on opposite sides of the trucks regardless of the relative positions between the trucks and car body, it being understood that the hand brake mechanism must be operated from the car body. In order to provide such an arrangement the flexible connection such as the chain 100 is pivoted to the cylinder lever 76 at 96, the flexible connection then being connected to the sheave 102 provided on the outer end of the rotatable shaft 104. The shaft is journalled in the brackets 106 and 108 provided on the truck frame, the inner end of the shaft being provided with the sheave 110. The flexible connection 112 is connected to the sheave 110, the opposite end of the flexible connection being pivoted as at 114 to the equalizing lever or bar 116 carried on the car body 10 in suitable guides 118.

The opposite end of the equalizing bar 116 is connected through a similar flexible connection to a shaft corresponding to the shaft 104 which is in turn connected to the piston of the opposite brake cylinder. The flexible connection 120 is connected to the equalizing bar 116 as at 122 which is substantially at mid-point of the equalizing bar, the opposite end of the flexible connection being connected to the sheave 124. The sheave 124 is provided with a shaft 126 journalled in suitable brackets 128 provided on the car body, the opposite end of shaft 126 being provided with the sheave 130 to which the flexible connection 132 is connected. The opposite end of the flexible connection, which may consist of the usual chain and link connection, is operatively connected to the brake staff 134 of the hand operating means 136.

With this arrangement equalization on each side of the truck is provided, turning of the truck beneath the car body producing the effect of causing a slack in part of the operating means on one side of the truck, and putting a strain on the flexible means on the opposite side of the truck, the slack and strain being equalized or compensated by proper turning of the equalizing bar 116 whereby similar operation of the brake systems on each side of the car is effected.

It is to be understood that I do not wish to be limited by the exact embodiment of the device shown, which is merely by way of illustration and not limitation, as various and other forms of the device will of course be apparent to those skilled in the art without departing form the spirit of the invention or the scope of the claims.

I claim:

1. In a brake arrangement, the combination of a car body, a truck for supporting said car body, said truck having spaced wheels, brakes disposed adjacent said wheels for cooperation therewith, a power cylinder for applying said brakes to said wheels, said brakes including a cylinder lever operated by the piston of said cylinder, an equalizer mounted on said car body and connected to said cylinder lever, a shaft mounted on said car body and provided with a flexible connection connected to said equalizer, and hand operated means mounted on said car body and flexibly connected to said shaft for manually operating said brakes.

2. In a brake arrangement, the combination of a car body, a truck for supporting said car body, said truck having spaced wheels, brakes disposed adjacent said wheels for cooperation therewith, a power cylinder for applying said brakes to said wheels, said brake arrangement including a cylinder lever operated by the piston of said cylinder, hand operating means for operating said brakes, said hand operating means including an equalizer mounted on said car body, a flexible hand connection on said car body for operating said equalizer, a shaft journalled to said truck, and flexible connections from said equalizer to said shaft and from said shaft to said cylinder lever whereby said brakes may be operated by said hand operating means.

3. In a brake arrangement, the combination of a car body, a truck for supporting said car body, said truck having spaced wheels, brakes disposed adjacent said wheels for cooperation therewith, a power cylinder for applying said brakes to said wheels, said brake arrangement including a cylinder lever operated by the piston of said cylinder, hand operating means for operating said brakes, said hand operating means including an equalizer mounted on said car body, a shaft journalled to said car body, flexible connections connected to said shaft, one of said connections being connected to hand operating means and the other of said connections being connected to said equalizer, a shaft journalled to said truck, and flexible connections from said equalizer to said shaft and from said shaft to said cylinder lever whereby said brakes may be operated by said hand operating means.

4. In a railway car, the combination of a car body, a car truck supporting said body, wheel and axle assemblies supporting said truck, brake means mounted on said truck adapted to cooperate with said wheel and axle assemblies, brake operating means mounted on said car body for operating said brake means, said brake operating means including an equalizer mounted on said car body, a shaft journalled on said car body, flexible operating means connected to said shaft, a flexible connection between said shaft and equalizer, and a flexible connection between said equalizer and said brake means.

5. In a railway car, the combination of a car body, a car truck supporting said body, wheel and axle assemblies supporting said truck, brake means mounted on said truck adapted to cooperate with said wheel and axle assemblies, brake operating means mounted on said car body for operating said brake means, said brake operating means including an equalizer mounted on said car body, a shaft journalled on said car body, flexible operating means connected to said shaft, a flexible connection between said shaft and equalizer, a shaft journalled on said truck, a flexible connection between said last named shaft and equalizer, and a flexible connection between said last named shaft and said brake means.

6. In a railway car, the combination of a car body, a car truck supporting said body, wheel and axle assemblies supporting said truck, brake means mounted on said truck adapted to cooperate with said wheel and axle assemblies, brake operating means mounted on said car body for operating said brake means, said brake operating means including an equalizer mounted on said car body, a shaft journalled on said car body, flexible operating means connected to said shaft, a flexible connection between said shaft and equalizer, a flexible connection between said equalizer and said brake means, and brake operating means mounted on said truck and connected to said brake means.

7. In a railway car, the combination of a car body, a car truck supporting said body, wheel and axle assemblies supporting said truck, brake means mounted on said truck adapted to cooperate with said wheel and axle assemblies, brake operating means mounted on said car body for operating said brake means, said brake operating means including an equalizer mounted on said car body, a shaft journalled on said car body, flexible operating means connected to said shaft, a flexible connection between said shaft and equalizer, a shaft journalled on said truck, a flexible connection between said last named shaft and equalizer, a flexible connection between said last named shaft and said brake means, and brake operating means mounted on said truck and connected to said brake means.

8. In a brake arrangement, the combination of a car body, a truck for supporting said car body, said truck having spaced wheels, brakes disposed adjacent said wheels for cooperation therewith, a power cylinder for applying said brakes to said wheels, said brakes including a cylinder lever operated by the piston of said cylinder, a shaft flexibly connected to said cylinder lever, an equalizer flexibly connected to said shaft, and hand operated means flexibly connected to said equalizer for manually operating said brakes.

9. In a brake arrangement, the combination of a car body, a truck for supporting said car body, said truck having spaced wheels, brakes disposed adjacent said wheels for cooperation therewith, a power cylinder for applying said brakes to said wheels, said brakes including a cylinder lever operated by the piston of said cylinder, a shaft flexibly connected to said cylinder lever, an equalizer flexibly connected to said shaft, a shaft flexibly connected to said equalizer, and hand operated means flexibly connected to said last named shaft for manually operating said brakes.

10. In a brake arrangement, the combination of a car body, a truck for supporting said car body, said truck having spaced wheels, brakes disposed adjacent said wheels for cooperation therewith, means on each side of said truck for operating the brakes on that side of the truck, a shaft mounted on each side of said truck and flexibly connected to the brakes on said sides, an equalizer on said car body flexibly connected to each of said shafts, and hand operated means on said car body flexibly connected to said equalizer for manually operating said brakes.

11. In a brake arrangement, the combination of a car body, a truck for supporting said car body, said truck having spaced wheels, brakes disposed adjacent said wheels for cooperation therewith, means on each side of said truck for operating the brakes on that side of the truck, a shaft mounted on each side of said truck and flexibly connected to the brakes on said sides, an equalizer on said car body flexibly connected to each of said shafts, a shaft on said car body flexibly connected to said equalizer, and hand operated means on said car body flexibly connected to said last named shaft for manually operating said brakes.

12. In a brake arrangement, the combination of a car body, a truck for supporting said car body, said truck having spaced wheels, brakes disposed adjacent said wheels for cooperation therewith, a shaft mounted on said truck and flexibly connected to said brakes, a shaft mounted on said car body and flexibly connected to said first named shaft, and hand operated means on said car body flexibly connected to said last named shaft for manually operating said brakes.

13. In a brake arrangement, the combination of a car body, a truck for supporting said car body, said truck having spaced wheels, brakes disposed adjacent said wheels for cooperation therewith, a shaft mounted on each side of said truck and flexibly connected to the brakes on said sides, a shaft on said car body flexibly connected to each of said other shafts whereby rotation of said last named shaft causes rotation of said first named shafts, and hand operated means on said car body flexibly connected to said last named shaft for manually operating said brakes.

14. In a brake arrangement, the combination of a car body, a truck for supporting said car body, said truck having spaced wheels, brakes disposed adjacent said wheel for cooperation therewith, a power cylinder on each side of said truck for operating the brakes on the respective sides of said truck, a shaft rotatably mounted on each side of said truck and connected to the adjacent brakes, and a single hand operated mechanism connected to each shaft for operating the brakes on both sides of the truck.

15. In a railway car, the combination of a car body, a car truck supporting said body, wheel and axle assemblies suporting said truck, brake means mounted on said truck adapted to cooperate with said wheel and axle assemblies, brake operating means for operating said brake means, said brake operating means including an equalizer, a shaft, means on the car body for operating said shaft, flexible connection between said shaft and equalizer, and a flexible connection between said equalizer and said brake means.

16. In a brake arrangement, the combination of a car body, a truck for supporting said car body, said truck having spaced wheels, brakes disposed adjacent said wheels for cooperation therewith, a shaft mounted on each side of said truck and flexibly connected to the brakes on said sides, means connecting said shafts, and operating means connected to said last named means.

17. In a brake arrangement, the combination of a car body, a truck for supporting said car body, said truck having spaced wheels, brakes disposed adjacent said wheels for cooperation therewith, a shaft mounted on each side of said truck and flexibly connected to the brakes on said sides of said truck, an equalizer member flexibly connected to said shafts, and operating means connected to said equalizer member.

18. In a brake arrangement, the combination of a car body, a truck for supporting said car body, said truck having spaced wheels, brakes disposed adjacent said wheels for cooperation therewith, a shaft flexibly connected to the brakes on a side of said truck, an equalizer member flexibly connected to said shaft, and operating means connected to said equalizer member.

19. In a brake arrangement, the combination of a car body, a truck for supporting said car body, said truck having spaced wheels, brakes disposed adjacent said wheels for cooperation therewith, a shaft mounted on each side of said truck and flexibly connected to the brakes on said sides of said truck, an equalizer member flexibly connected to said shafts, operating means connected to said equalizer member, and means on each side of said truck for operating the brakes on that side of said truck.

20. In a brake arrangement, the combination of a car body, a truck for supporting said car body, said truck having spaced wheels, brakes disposed adjacent said wheels for cooperation therewith, a shaft mounted on each side of said truck and flexibly connected to the brakes on said sides of said truck, an equalizer member flexibly connected to said shafts, operating means connected to said equalizer member, and means on each side of said truck intermediate the wheels for operating the brakes on that side of said truck.

WALTER H. BASELT.